United States Patent [19]

Schmitt

[11] Patent Number: 5,350,853
[45] Date of Patent: Sep. 27, 1994

[54] PREPARATION OF DIANTHRAQUINONE-N,N'-DIHYDROAZINE AND ITS CHLORINATION PRODUCTS

[75] Inventor: Michael Schmitt, Worms, Fed. Rep. of Germany

[73] Assignee: BASF Aktiengesellschaft, Ludwigshafen, Fed. Rep. of Germany

[21] Appl. No.: 54,235

[22] Filed: Apr. 30, 1993

[30] Foreign Application Priority Data

May 30, 1992 [DE] Fed. Rep. of Germany ....... 4217954

[51] Int. Cl.$^5$ .......................................... C07D 241/46
[52] U.S. Cl. ..................................... 544/339; 544/341
[58] Field of Search ............................... 544/339, 341

[56] References Cited

U.S. PATENT DOCUMENTS 3,268,532 8/1966 Zerweek .............................. 544/339
4,628,091 12/1986 Kato et al. .......................... 544/339

FOREIGN PATENT DOCUMENTS 1264648 12/1963 Fed. Rep. of Germany .
3422385 12/1984 Fed. Rep. of Germany .

OTHER PUBLICATIONS

Hirayama, Chemical Abstracts, vol. 107, No. 12, Sep. 1987, AN-98205w, JP-A-62 025 167, Feb. 3, 1987.

Primary Examiner—Mark L. Berch
Attorney, Agent, or Firm—Oblon, Spivak, McClelland, Maier & Neustadt

[57] ABSTRACT

A process for preparing dianthraquinone-N,N'-dihydroazine (I)

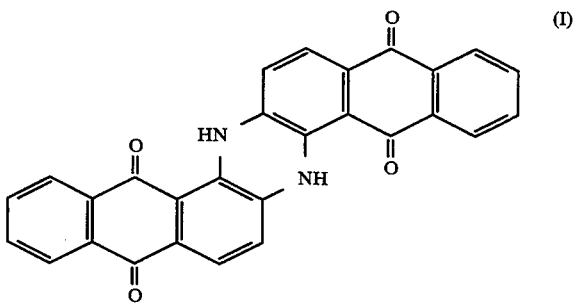

and its chlorination products (Ia)

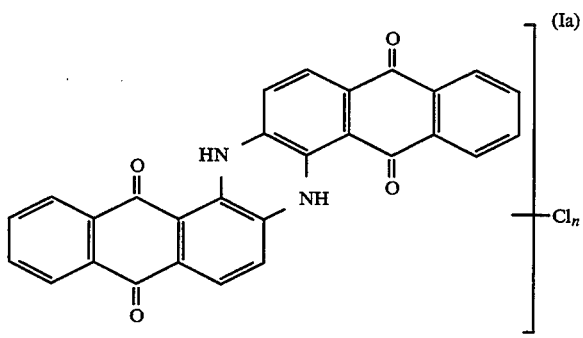

where n is 1 or 2, by condensation of 1-aminoanthraquinone (II) in the presence of an alkaline condensing aid, an oxidizing agent and a cyclic urea derivative at from 80° to 150° C. and subsequent purification and/or chlorination comprises using N,N'-dimethylpropyleneurea as the urea derivative.

1 Claim, No Drawings

PREPARATION OF DIANTHRAQUINONE-N,N'-DIHYDROAZINE AND ITS CHLORINATION PRODUCTS

The present invention relates to an improved process for preparing dianthraquinone-N,N'-dihydroazine (I)

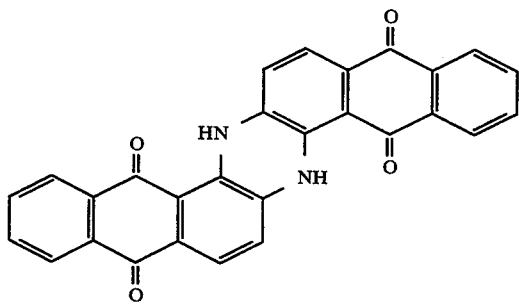

and its chlorination product (Ia)

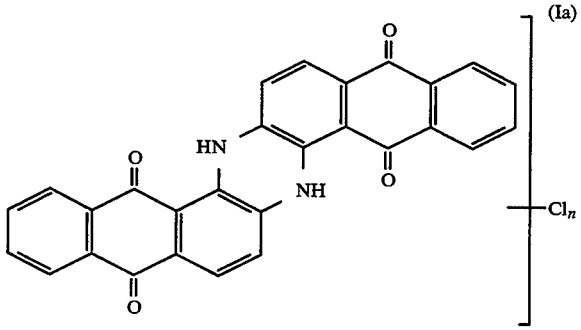

where n is 1 or 2, by condensation of 1-aminoanthraquinone (II) in the presence of an alkaline condensing aid, an oxidizing agent and a cyclic urea derivative at from 80° to 150° C. and subsequent purification and/or chlorination.

The anthraquinone derivatives (I) and (Ia) correspond to the important vat dyes C.I. Vat Blue 4 (C.I. 69800, customarily referred to as indanthrone), C.I. Vat Blue 14 (C.I. 69810, n=11), and C.I. Vat Blue 6 (C.I. 69825, n=2, 3,3'-dichloroindanthrone).

Indanthrone can be prepared by condensation not only of 2-aminoanthraquinone but also of 1-aminoanthraquinone.

In the traditional process of preparation, 2-aminoanthraquinone is heated in a sodium hydroxide/potassium hydroxide melt to 200°-225° C. in the presence of oxidizing agents such as sodium nitrate or sodium chlorate. However, this reaction gives rise to appreciable amounts of undesirable by-products such as alizarin, 2-amino-1-hydroxyanthraquinone and flavanthrone, which is why alternative methods starting from 1-aminoanthraquinone have been proposed.

In these later processes, 1-aminoanthraquinone is oxidized, preferably by air, in a phenoxide or hydroxide melt in the presence or absence of further auxiliaries such as dimethyl sulfoxide. DE-A-34 22 385 discloses a process wherein the condensation of 1-aminoanthraquinone takes place in the presence of 1,3-dimethylimidazolidin-2-one.

However, even these processes are unsatisfactory because of likewise inadequate purity of the product and hence insufficient yields or because of the poor filtration properties of the product.

The corresponding chloroindanthrones can, as will be known, be prepared by reacting indanthrone with chlorine in an inert, organic solvent such as nitrobenzene or in sulfuric acid in the presence of small amounts of manganese dioxide. Again, the indanthrone used must be sufficiently pure in order that a satisfactory chlorination product may be obtained. For this reason the condensation product is in general subjected to a reductive purification and a subsequent oxidation in air.

It is an object of the present invention to make available indanthrone in high purities and good yields in an economical manner and hence also to make possible an advantageous production of chloroindanthrone.

We have found that this object is achieved by a process for preparing dianthraquinone-N,N'-dihydroazine (I)

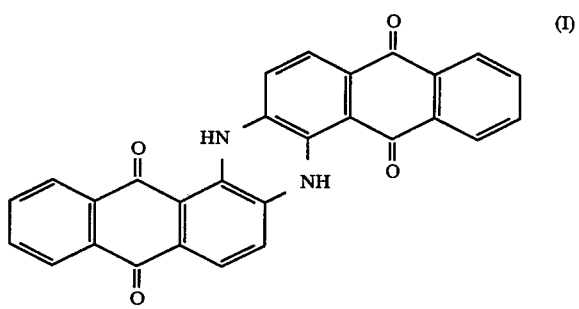

and its chlorination products (Ia)

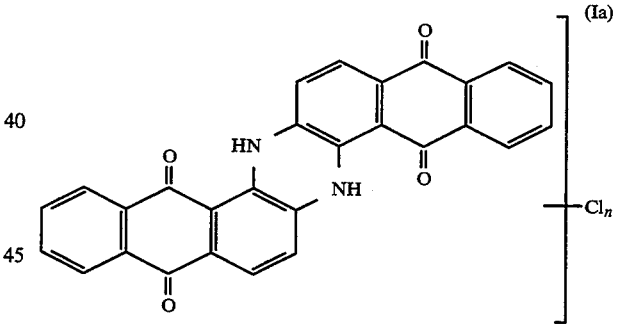

where n is 1 or 2, by condensation of 1-aminoanthraquinone (II) in the presence of an alkaline condensing aid, an oxidizing agent and a cyclic urea derivative at from 80° to 150° C. and subsequent purification and/or chlorination, which comprises using N,N'-dimethylpropyleneurea as the urea derivative.

N,N'-Dimethylpropyleneurea

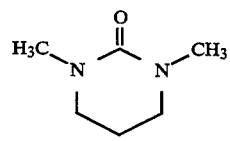

is in general used in the process of the invention in amounts of from 0.05 to 10 parts by weight, preferably from 0.1 to 5 parts by weight, particularly preferably from 1 to 3 parts by weight, per part by weight of 1-aminoanthraquinone (II), if desired in the form of a mixture with an inert, organic solvent such as dimethyl sulfoxide, pyridine, toluene, xylene or nitrobenzene.

The alkaline condensing aid used can be the bases customarily used for this purpose such as sodium hydroxide and in particular potassium hydroxide. They can be used in the form of a solid or preferably in the form of an aqueous solution, preferably of 50% strength by weight. The amount used is in general from 0.1 to 10 parts by weight, preferably 0.2 to 2.5 parts by weight, per part by weight of (II).

Suitable oxidizing agents are air, oxygen, peroxidic salts such as perborates, nitrates and chlorates. Air and oxygen are particularly favorable.

In some cases it can be of advantage to add to the reaction medium a wetting agent which does not react under the reaction conditions, for example a naphthalene or alkylnaphthalene-sulfonate or a sulfurated oleamide.

1-Aminoanthraquinone (II) can be used as a powder, as a wet filter cake or as a suspension and this suspension may be admixed with all or some of the condensing aid.

The reaction temperature in the process of the invention is in general from 80° to 150° C. and depends on the amount of N,N'-dimethylpropyleneurea.

The process is advantageously carried out by initially charging a mixture of 1-aminoanthraquinone (Ii) and N,N'-dimethylpropyleneurea, heating it to about 90°–100° C., and then adding the condensing aid while air is passed through the reaction mixture at a rate of about 200–300 ml/min. After the addition has ended, the temperature is preferably raised to 120°–130° C., and some of the water distils off.

The reaction takes in general from 4 to 12 h. Its end can be determined in a conventional manner using thin layer chromatography.

The reaction mixture can be worked up for the indanthrone (I) in a conventional manner by precipitating with water and filtering off the precipitate. Here it is found that a product (I) prepared according to the invention gives appreciably reduced filtration times compared with a product obtained as described in DE-A-34 22 385.

N,N'-Dimethylpropyleneurea can advantageously be recovered from the aqueous phase by distillation or solvent extraction and used for further reactions.

Subsequently the product (I) is in general subjected to a customary purifying aftertreatment. To this end it is first suspended in water and reduced with a reducing agent such as sodium dithionite in the presence of a base such as sodium hydroxide to the leuco form. The sodium salt thereof can be filtered off again, washed with water and reoxidized with air to the indanthrone (I).

If the chlorinated indanthrones (Ia) are to be prepared, it is likewise possible to employ one of the conventional chlorination techniques. A favorable option is the chlorination of indanthrone (I) in sulfuric acid, which in general is carried out as follows:

The dry or as-filtered, still moist product (I) is dissolved in sulfuric acid to form a solution with a sulfuric acid concentration of about 92% by weight. Small amounts of manganese dioxide are added as catalyst, and chlorine is passed through the solution at about 50°–55° C. After the chlorination has ended, the reaction mixture is diluted with water to set the sulfuric acid concentration at about 83% by weight and then filtered. The filter residue is then completely dissolved in 98% strength by weight sulfuric acid and reduced, for example with aluminum powder, to form the desired chloroindanthrones (Ia).

It is of advantage that the indanthrone (I) prepared according to the invention is directly obtained in a sufficiently pure form that in general a purifying aftertreatment can be dispensed with prior to chlorination.

The process of the invention can thus be used to obtain not only indanthrone (I) but also its chlorine derivatives (Ia) in very good yields and high purities. The blue dyeings obtainable therewith are notable for purity of hue and brilliance. It is of particular advantage that indanthrone (I) is directly obtained in a readily filterable form and so can be isolated in an economical manner after short filtration times.

EXAMPLES

Preparation of Indanthrone (I) and Chloroindanthrone (Ia)

EXAMPLE 1

A mixture of 150 g of 1-aminoanthraquinone (97.5% pure) and 230 g (220 ml) of N,N'-dimethylpropyleneurea was heated to 95°–100° C. Air was then passed through at a rate of 300 ml/min and at the same time 141 g of a 50% strength by weight sodium hydroxide solution were added dropwise over 3 h. The temperature was then raised to 125°–130° C. for 8 h and some of the water was distilled off. The end of the reaction was determined by thin layer chromatography (absence of 1-aminoanthraquinone).

The product (I) was precipitated by adding the reaction mixture to 800 ml of water, filtered off and washed. The filtration time was 2.5 h.

For purification, the filter residue was stirred into a solution of 152 g of sodium hydroxide in 4,900 ml of water. 83 g of sodium dithionite were added at 60° C. and the mixture was subsequently stirred for 20 min. The precipitated sodium salt of the leucoindanthrone was then filtered off at 50° C., washed and oxidized in air.

The indanthrone (I) was obtained in a yield of 142 g, 98% of theory.

COMPARATIVE EXAMPLE 1

The condensation of 150 g of 1-aminoanthraquinone (97.5% pure) was carried out in 230 g (220 ml) of 1,3-dimethylimidazolidin-2-one as described in Example 1.

The filtration to remove the product (I) took 60 h.

The purification, which was also carried out in a similar manner, gave 137 g of indanthrone (I), which corresponds to a yield of 95%.

EXAMPLE 2

To a solution of 80 g of indanthrone (I) of Example 1 in 800 g of 92% strength by weight sulfuric acid was added 4 g of manganese dioxide and then 64 g of chlorine were introduced at 50°–55° C. over 10 h. The reaction mixture was introduced into 104 g of 75% strength by weight sulfuric acid, and 88 ml of water were added dropwise while the temperature was kept below 55° C.

After cooling down to room temperature, the precipitated chlorination product (Ia) was filtered off and washed with water.

The filter residue was then dissolved in a mixture of 228 g of 96% strength by weight sulfuric acid and 320 g of oleum (24% by weight of $SO_3$). After 2.4 g of aluminum powder had been added at 50° C., the mixture was subsequently stirred for 1 h and then introduced into 2,000 ml of water.

The resulting precipitate of product (I) was filtered off, washed neutral with water and dried.

The yield obtained was 70 g of chloroindanthrone having a chlorine content of 6.9% by weight (n=1), corresponding to 81% of theory, based on (I).

EXAMPLE 3

102.6 g of 1-aminoanthraquinone (97.5% pure) were condensed in the presence of 200 g (190 ml) of N,N'-dimethylpropyleneurea as described in Example 1 to form indanthrone (I).

However, the as-obtained product (I) was not subjected to any purifying aftertreatment but directly chlorinated as described in Example 2.

The yield obtained was 103 g of chloroindanthrone (Ia) having a chlorine content of 7.2% by weight (n=1), corresponding to 96% of theory, based on 1-aminoanthraquinone.

EXAMPLE 4

102.6 g of 1-aminoanthraquinone (97.5% pure) were condensed in the presence of 200 g (190 ml) of N,N'-dimethylpropyleneurea as described in Example 1 to form indanthrone (I).

The as-obtained product (I) was not further purified before being used in a chlorination.

To this end the filter residue obtained was dissolved in 760 g of 91.5% strength by weight sulfuric acid. 155 g of chlorine were passed into this solution at 50°-55° C. over 21 h. Then 110 ml of water were added dropwise while the temperature was maintained below 55° C.

After cooling down to room temperature, the precipitated chlorination product (Ia) was filtered off and washed with 200 g of 80% strength by weight sulfuric acid.

For purification, the filter residue was dissolved in 440 g of 98% strength by weight sulfuric acid. After addition of 2.2 g of aluminum powder at 50° C. the mixture was additionally stirred for 30 min until the exothermic reaction had ceased and then introduced into ml of water.

The resulting precipitated product (Ia) was filtered off, washed neutral with water and dried.

The yield obtained was 93 g of chloroindanthrone having a chlorine content of 13.6% by weight (n=2), corresponding to 81% of theory, based on 1-aminoanthraquinone.

We claim:

1. A process for preparing dianthraquinone-N,N'-dihydroazine (I)

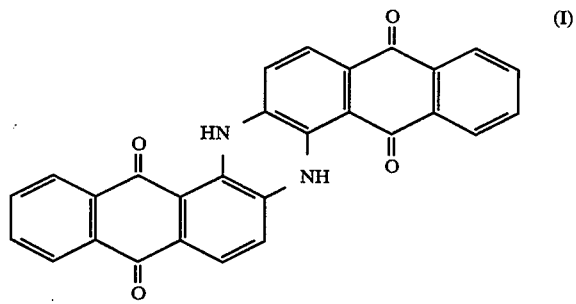

and its chlorination products (Ia)

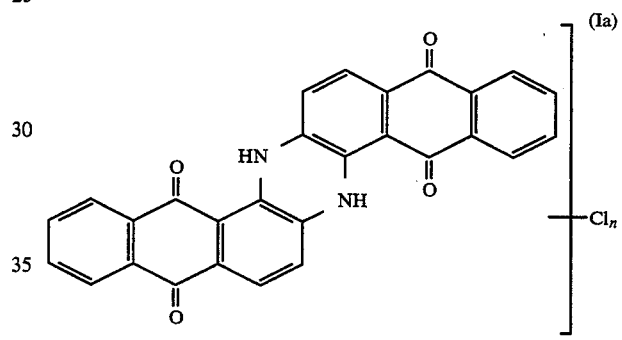

where n is 1 or 2, by condensation of 1-aminoanthraquinone (II) in the presence of an alkaline condensing aid, an oxidizing agent and a cyclic urea derivative at from 80° to 150° C. and subsequent purification and/or chlorination, which comprises using N,N'-dimethylpropyleneurea as the urea derivative.

* * * * *